(No Model.)
J. GALLAND.
COMBINED THRASHING MACHINE AND GRAIN SEPARATOR.
No. 482,554. Patented Sept. 13, 1892.
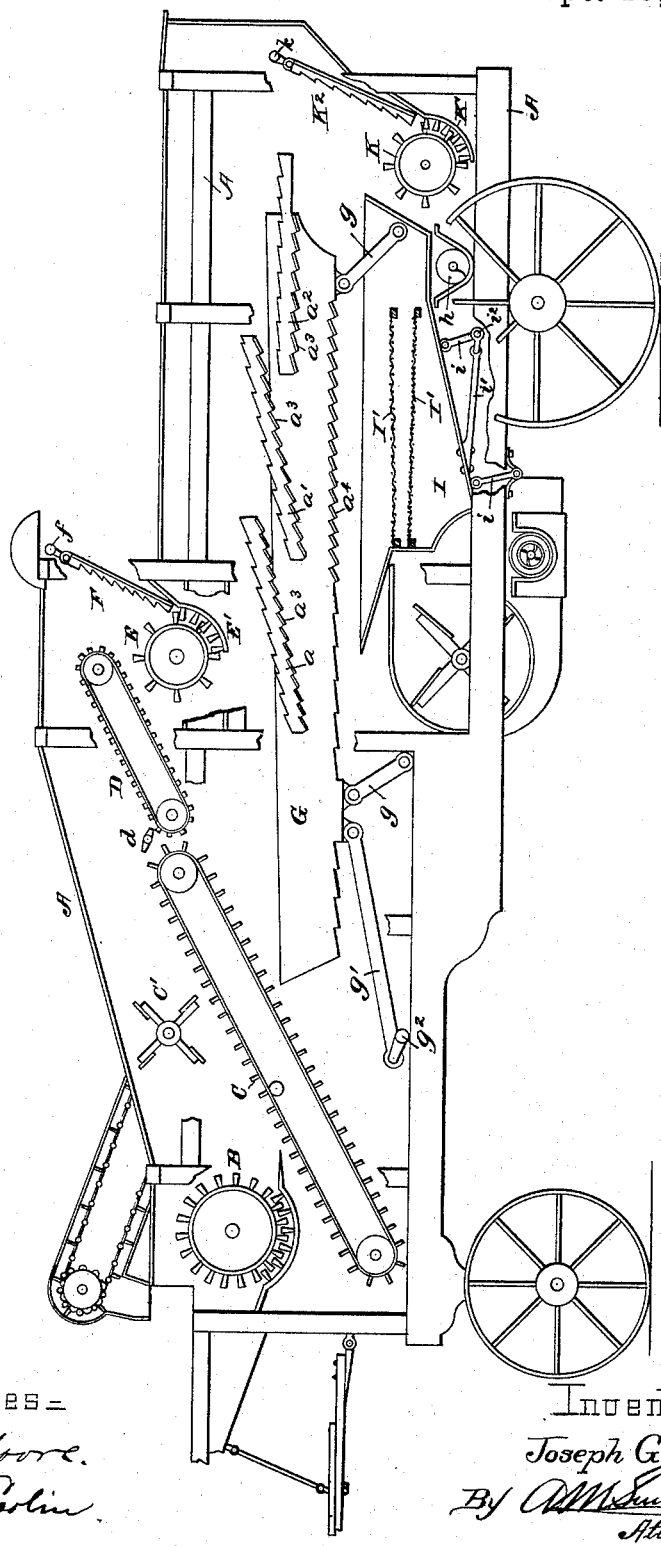
Witnesses
Ee. M. Moore.
J. H. Carlin
Inventor
Joseph Galland,
By A. M. Smith & Son
Attorneys.

UNITED STATES PATENT OFFICE.

JOSEPH GALLAND, OF MANSFIELD, OHIO, ASSIGNOR TO THE AULTMAN & TAYLOR MACHINERY COMPANY, OF SAME PLACE.

COMBINED THRASHING-MACHINE AND GRAIN-SEPARATOR.

SPECIFICATION forming part of Letters Patent No. 482,554, dated September 13, 1892.

Application filed March 11, 1892. Serial No. 424,565. (No model.)

*To all whom it may concern:*

Be it known that I, JOSEPH GALLAND, a citizen of the United States, and a resident of Mansfield, county of Richland, and State of Ohio, have invented a new and useful Improvement in a Combined Thrashing-Machine and Grain-Separator, of which the following is a full, clear, and exact description, reference being had to the accompanying drawings, making part of this specification.

My invention relates to the arrangement of the parts of a combined thrashing, straw-bruising, and grain-separating machine, whereby a thorough thrashing and separation of the grain from the straw is effected and the latter discharged from the machine in condition for use as feed for stock, and it will be understood from the following description and claims, reference being had to the accompanying drawing, which represents a grain-thrashing machine and grain-separator and straw-bruiser in side elevation with the adjacent side casings removed to show the arrangement of the operative parts.

A A indicate the framework of the machine; B, the thrashing-cylinder and concave, and which may be of any usual or preferred construction, and from which the grain and straw are discharged upon an inclined endless apron-carrier C. In rear of the thrashing-cylinder and directly over the slatted apron C, near the middle of its length, is located a four-armed beater C', which serves to intercept the straw as it is ejected by the thrashing-cylinder and to beat it down upon the carrier-apron.

Immediately in rear of the apron C and receiving the straw therefrom is an inclined endless raddle D, composed, preferably, of side straps or bands connected by transverse slats sufficiently separated to permit any grain and chaff released from the straw to pass readily between them to the shaker underneath.

$d$ indicates a beater located between the apron C and raddle D and above the forward lower end of the latter and over which the straw passes to the raddle being beaten up in its passage by said beater for shaking out the grain.

The straw passing off the upper end of the raddle D is fed to a forwardly-delivering straw bruising and cutting cylinder and concave at E E' by means of a forwardly-inclined toothed feeder-plate F, to which a vibratory motion is imparted through its connection with a crank-shaft $f$, and a regular force feed of the straw to said secondary thrashing-cylinder is thereby effected. This bruising and cutting cylinder is located at or near the center of the length of the machine for which reason and because it is about midway between the thrashing-cylinder B and a second bruising and cutting cylinder at the tail end of the machine I term the "central bruising-cylinder." These cutting and bruising cylinders, concaves, and feeders are similar in construction to the corresponding parts described in Letters Patent No. 411,803, granted to me October 1, 1889, and therefore need not be here described in detail. Any grain imperfectly thrashed by the cylinder B will thus be subjected to the action of this central bruising-cylinder, and any defective action of the thrashing-cylinder will thereby be remedied and a material saving in grain effected. The grain and straw passing from this central bruising-cylinder are deposited on the straw-shaker G. The shaker is what we term "double-decked" and is constructed with longitudinal side boards set on edge and two or more series of narrow intermediate strips $a\ a'\ a^2$, also set on edge, preferably inclining forwardly and overlapping, as shown, and stepped or provided with saw-shaped teeth on both edges. The inclined faces of the lower teeth have slats $a^3$ connected to them, sufficiently separated on their adjacent edges to permit the grain to pass freely between them to the lower deck of the shaker, said slats connecting the longitudinal strips of the same series with each other and with the side boards of the shaker. The lower edges of the side boards are also stepped to give a backward thrust to the material resting on the bottom or lower deck of the shaker; but the flooring at the forward end of said deck, although stepped, is made close for causing the grain and heavier matter to settle and separate from the chaff, leaving the latter free to pass on lightly over the spaced slats at $a^4$, forming the rear end flooring of the lower deck overlying the shoe, the grain passing readily between said slats to the shoe-screens. The tailings, passing off the rear end of said lower deck and from the shoe-screens and falling into a lateral conveyer at $h$, are carried to the tailings-elevator, (indicated at H,) by which they are returned to the thrashing-cylinder in a manner well understood.

The shaker is supported on upright forwardly-inclined links $g\ g$ and is vibrated by means of a pitman $g'$, connecting it with a crank-shaft $g^2$, the arrangement of the pivoted supporting-links $g$ being such as to give a rising movement or uplift to the shaker in the backward thrust of the pitman and a falling movement in the forward throw, thereby giving a tossing movement to the contents of the shaker, which is found very effective in loosening up the straw and releasing the grain.

The shoe indicated at I is of any usual construction, provided with screens I', and, like the shaker, is supported on upright forwardly-inclined links $i\ i$, which, in connection with a pitman $i'$, connecting it with a crank-shaft $i^2$, give it a tossing endwise movement longitudinally of the machine similar to that of the shaker, but with a shorter throw, as more effective in separating the grain from the chaff.

The pitman $i'$ is formed from a wooden bar cut away or made thin and flat intermediate its ends to render it elastic and yielding and give it an elastic or springing action, found very effective in practice.

The steps or teeth on the upper faces of the longitudinal strips $a\ a'\ a^2$ serve to thrust the straw backward in a manner well understood. The strips $a^2$ project beyond the flooring or lower deck of the shaker and deliver the straw to a cutting and bruising cylinder K, provided with a concave K' and a feeder K², operated from a crank-shaft $k$, said parts being similar to those of the central bruising-cylinder above referred to. The object of this final bruising and cutting of the straw is to bring it into suitable condition for feeding to stock, the grain having been thoroughly removed from it previous to its reaching said cylinder, from which it is discharged either on the ground or upon a stacker or endless carrier, as preferred. Parts of the machine not particularly referred to may be constructed and arranged in any usual manner.

The construction described constitutes an improvement upon the machine upon which Letters Patent were granted to me October 16, 1888, No. 391,139, and October 1, 1889, No. 411,803; but in the first of these dependence was had on the ordinary devices for feeding the straw to the secondary or cutting and bruising cylinder, and in the latter the inclined feeder-plate or force-feed was employed only in connection with the tail-end cutting and bruising cylinder. The consequence was that a material loss of grain took place owing to the fact that the straw, not being forced into engagement with the secondary thrashing-cylinder, accumulated around said cylinder and tended to obstruct and clog its action, and, if it passed said cylinder at all, passed in heavy masses or wads, which rendered the action of the secondary thrashing-cylinder imperfect and unsatisfactory in its results. In the second patent referred to the force-feed was applied to the tail-end cutting and bruising cylinders only, and as this was after the straw had passed beyond the separating devices the grain passing with said straw to the cylinder was lost to the farmer. The discovery of this fact led to the arrangement of the force-feed in combination with the central and secondary thrashing-cylinder. As a result a regular and uniform feed of the straw thereto in its loosened and shaken-up condition is maintained and a material saving of the grain is effected.

Having thus described my invention, what I claim as new, and desire to secure by Letters Patent, is—

1. The combination, in a combined thrashing-machine and grain-separator, of the thrashing-cylinder B, the apron C, beater C', raddle D, forwardly-delivering bruising-cylinder E, with its forwardly-inclined feeder-plate F, and the shaker G, extending forwardly under aprons C D and cylinder E and operating substantially as described.

2. The combination of the thrashing-cylinder B, the apron-carrier C, beaters C' and $d$, raddle D, forwardly-delivering bruising-cylinder E, with its feeder-plate F and the double-decked shaker G, extending forwardly under raddles C D and cylinder E, and bruising-cylinder K, with its feeder-plate K², all arranged and operating substantially as and for the purpose described.

In testimony whereof I have hereunto set my hand this 7th day of March, A. D. 1892.

JOSEPH GALLAND.

Witnesses:
J. E. BROWN,
GEO. W. PYLE.